United States Patent
Chen et al.

(10) Patent No.: US 7,329,463 B2
(45) Date of Patent: *Feb. 12, 2008

(54) LOW DAMPING FUSER ROLLER COMPOSITION

(75) Inventors: Jiann-Hsing Chen, Fairport, NY (US); Joseph A. Pavlisko, Pittsford, NY (US); Robert A. Lancaster, Hilton, NY (US); Nataly Boulatnikov, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 10/887,059

(22) Filed: Jul. 7, 2004

(65) Prior Publication Data

US 2005/0009981 A1    Jan. 13, 2005

Related U.S. Application Data

(60) Provisional application No. 60/486,343, filed on Jul. 11, 2003.

(51) Int. Cl.
*B22B 27/26* (2006.01)

(52) U.S. Cl. .................. 428/421; 427/387; 427/388.2; 525/326.2; 525/340; 525/384

(58) Field of Classification Search ................ 427/387; 428/421; 525/326.1, 340, 384
See application file for complete search history.

(56) References Cited

U.S. PATENT DOCUMENTS

| | | | | |
|---|---|---|---|---|
| 5,744,200 | A * | 4/1998 | Badesha et al. | 427/387 |
| 6,355,352 | B1 * | 3/2002 | Chen et al. | 428/421 |
| 6,361,829 | B1 | 3/2002 | Chen et al. | 427/380 |
| 6,372,833 | B1 | 4/2002 | Chen et al. | 524/409 |
| 6,393,249 | B1 | 5/2002 | Aslam et al. | 399/333 |
| 6,429,249 | B1 | 8/2002 | Chen et al. | 524/432 |
| 6,747,110 | B2 * | 6/2004 | Rajagopalan | 526/254 |
| 2005/0008805 | A1 * | 1/2005 | Chen et al. | 428/36.8 |

FOREIGN PATENT DOCUMENTS

| | | |
|---|---|---|
| EP | 0 344 481 | 12/1989 |
| EP | 1 170 333 A1 | 1/2002 |
| EP | 1 376 260 A2 | 1/2004 |
| EP | 1 385 064 A2 | 1/2004 |
| JP | 10-31386 A * | 2/1998 |

* cited by examiner

*Primary Examiner*—David W. Wu
*Assistant Examiner*—Henry Hu
(74) *Attorney, Agent, or Firm*—Carl F. Ruoff

(57) ABSTRACT

This invention relates to a low camping fluorocarbon thermoplastic random copolymer roller coating having a closely controlled curing agent content.

10 Claims, 2 Drawing Sheets

LOW DAMPING FUSER ROLLER COMPOSITION

CROSS REFERENCE TO RELATED APPLICATION

Reference is made to and priority claimed from U.S. Provisional Application Ser. No. 60/486,343, filed Jul. 11, 2003, entitled LOW DAMPING FUSER ROLLER COMPOSITION.

FIELD OF THE INVENTION

This invention relates to a roller system for fixing heat softenable toner particles to a receiver in electrophotographic processes and apparatus by passing a receiver sheet bearing toner particle images between a pressure roller and a fuser roller at elevated temperature and pressure to fix the toner particle images onto the receiver. More particularly, the invention relates to a roller composition for use as the exterior layer on a fuser roller or a pressure roller, which provides improved release properties for the release of the receiver sheet and fused toner particles from the fuser roller.

BACKGROUND OF THE INVENTION

In electrophotographic copying, an electrostatic latent image is developed on a primary image-forming member, such as a photoconductive surface, and developed with a thermoplastic toner powder to form a toner powder image. The toner image is thereafter transferred to a receiver, such as a sheet of paper, plastic or the like, and the toner image is subsequently fused to the receiver in a fusing section using heat, pressure, or both. A fuser section includes fuser members, which are typically rollers, although fuser belts and the like may also be used. Typically, a pressure roller and a fuser roller are used and at least one of the two rollers is usually heated. The essential function performed in the fusing section is the application of heat and pressure to the toner powder image on the receiver to fix the image to the receiver. In the discussion of this invention, the terms "pressure roller" and "fuser roller" will be used to refer to the two rollers used in the fuser section. It should be understood that the reference to rollers also includes a reference to fuser belts and similar equipment that provide similar heat and pressure treatment for latent images on receiver sheets. The term roller is also used to refer to any roller or belt or other similar equipment used in the fusing system.

The fusing step is commonly carried out by passing the toner image-bearing receiver between a pair of engaged rollers that produce an area of pressure contact known as a fusing nip. In order to form the nip, at least one of the rollers typically includes a compliant or conformable layer. Heat is transferred from at least one of the rollers to the toner in the fusing nip causing the toner to partially melt and attach to the receiver. In the case where the fuser member is a heated roller, a resilient and compliant pressure roller having a smooth surface is typically used. Where the fuser member is in the form of a belt, such as a flexible endless belt that passes around the heated roller, it typically has a smooth, hardened outer surface.

Most fuser sections, which are known as simplex fusers, attach toner to only one side of the receiver at a time. In such fusers it is common for a first of the two rollers to be driven rotatably by an external source. The second roller is then rotatably driven by frictional contact with the first roller. Similarly, heat is typically applied to only one of the rollers. The heat may be applied by the use of one or more heat rollers to heat the exterior of the heated fuser roller or the heat may be applied internally to the heated fuser roller.

Two basic types of heated rollers have been used. One type uses a conformable or compliant pressure roller to form a fusing nip against a hard, heated fuser roller. The other uses a compliant fuser roller to form the nip against a hard, heated and relatively non-conformable pressure roller. A fuser roller designated as compliant typically comprises a conformable layer having a thickness greater than about 2 millimeters (mm) and in some instances greater than about 25 mm. A fuser roller designated as hard comprises a rigid cylinder that may have a relatively thin polymeric or conformable elastomeric coating less than about 1.25 mm thick on its exterior. There are certain advantages associated with both compliant and noncompliant rollers. Typically, fuser rollers include a conformable layer that may be formed of any suitable material, such as for instance, polydimethylsiloxane elastomer.

Typically, fuser rollers include a hollow cylinder core, which is often metallic, with a roller cushion layer formed about the roller. Such cushion layers are commonly made of silicone rubbers or silicone polymers having a low surface energy such as polydimethylsiloxane, which minimizes the adherence of toner to the roller, especially the heated rollers. It is also known that cured polyfluorocarbon polymers and copolymers may be used to coat the cushion layer surface to further reduce the tendency of the toner to adhere to the roller and minimize contact of release oils with the cushion layer.

The cushion layer may include fillers comprising inorganic particles such as metals, metal oxides, metal hydroxides, metal salts, mixtures thereof and the like. These materials function to improve the thermal conductivity of the cushion layer. The use of such filler particles is disclosed in U.S. Pat. No. 6,393,249B1 issued May 21, 2002 to Muhammed Aslam et al. and assigned on its face to NexPress Solutions LLC. This patent is hereby incorporated in its entirety by reference.

It is also known that various fluoropolymers, such as thermoplastic fluorocarbon polymers and random copolymers are useful as coatings on such rollers. Some fluorocarbon thermoplastic polymers and thermoplastic random copolymers, including various materials, are disclosed in U.S. Pat. No. 6,355,352B1 issued Mar. 12, 2002 to Jiann H. Chen et al. and assigned on its face to NexPress Solutions LLC, U.S. Pat. No. 6,361,829 issued Mar. 26, 2002 to Jiann H. Chen et al.; U.S. Pat. No. 6,372,833B1 issued Apr. 16, 2002 to Jiann H. Chen et al. and assigned on its face to NexPress Solutions LLC; and U.S. Pat. No. 6,429,249B1 issued Aug. 6, 2002 to Jiann H. Chen et al. and assigned on its face to NexPress Solutions LLC. These patents are hereby incorporated in their entirety by reference.

While silicone rubbers and silicone polymers have been used widely as cushion layers, they have also in some instances been used as an exterior layer. Fluoroelastomers and rubbers, such as rubbers made of ethylene propylene diene monomers and the like have also been used as cushion materials. Unfortunately in many fusing processes the exterior of the fuser roller in direct contact with the toner, especially a heated fuser roller, is coated with a release oil during fusing. Such release oils are generally detrimental to silicone rubbers and silicone polymers. Polyfluorocarbon polymers and random copolymers coated over the outside of the cushion have been found to be resistant to such oils and provide a low energy surface which has improved release properties from the toner and the receiver and are not adversely effected by the commonly used oils.

Notwithstanding the availability of such polymers having improved release functions, it is desirable to further improve the release properties of the receivers and toners from the fuser roller quickly after the receiver sheets leave the nip. Continued efforts have been directed to the development of improved exterior coatings for fuser rollers that will provide for immediate release of the receiver sheet from the rollers, especially the heated fuser roller after the fusing operation has been concluded. Continued efforts have been directed to the development of low damping fluorocarbon thermoplastic random copolymers for use as exterior coatings on the fuser rollers.

SUMMARY OF THE INVENTION

According to the present invention, it has been found that improved release properties are achieved using a low damping fluorocarbon thermoplastic random copolymer roller coating formulation, the formulation having a tangent (tan) delta from about 0.01 to about 0.15 and comprising: a fluorocarbon thermoplastic random copolymer containing from about 5 to about 20 parts per hundred (pph) based upon the weight of the copolymer of an aminosiloxane and from about 1.5 to about 2.5 pph based upon the weight of the copolymer of a curing agent having a bisphenol residue.

It has further been found that improved release properties are achieved by an improvement in a low-damping fluorocarbon thermoplastic random copolymer roller coating formulation comprising a fluorocarbon thermoplastic random copolymer; from about 5 to about 20 pph based upon the weight of the copolymer of an aminosiloxane; and a curing agent having a bisphenol residue, the improvement comprising the use of a quantity of curing agent from about 1.5 to about 2.5 pph based on the weight of the copolymer and adjusting the tan delta of the formulation to a value from about 0.01 to about 0.15.

DESCRIPTION OF PREFERRED EMBODIMENTS

Figure 1:
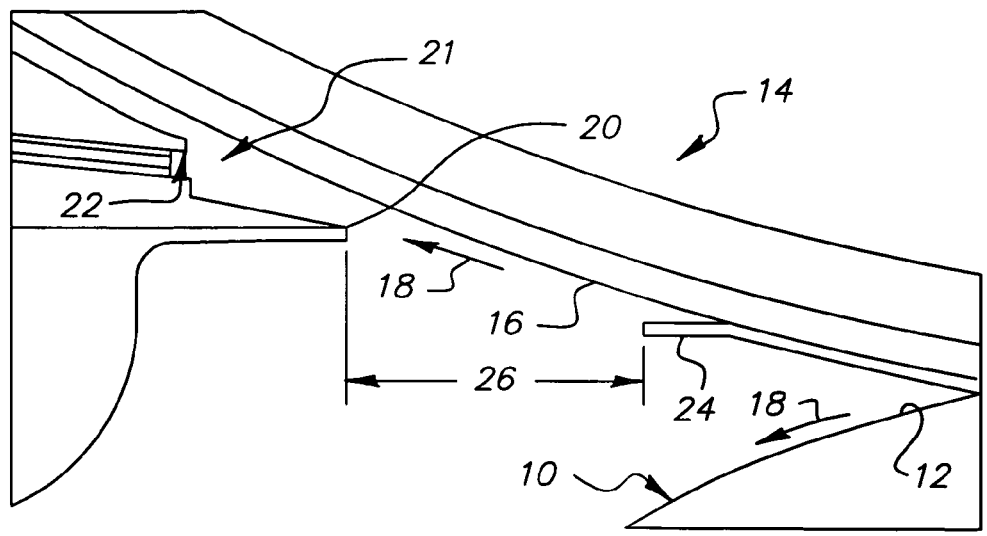
FIG. 1 is a schematic diagram of a receiver sheet leaving a nip between a fuser roller and a pressure roller demonstrating a measurement referred to as the release distance.

According to the present invention, a low damping fluorocarbon thermoplastic random copolymer roller coating formulation is provided. This formulation provides for improved release distance operation in a fuser section by ensuring prompt release of a receiver sheet from the fuser roller. The formulation comprises a fluorocarbon thermoplastic random copolymer containing from about 5 to about 20 pph based on the weight of the copolymer of an aminosiloxane and from about 1.5 to about 2.5 pph based upon the weight of the copolymer of a curing agent having a bisphenol residue.

The curing agent contains an organophosphonium salt and a dihydroxy aromatic compound. The curing agent includes these materials in a ratio of about 1 part organophosphonium salt per 4 parts of dihydroxy aromatic compound.

A preferred organophosphonium salt is benzltriphenylphosphonium chloride.

The dihydroxy aromatic compound is selected from the group containing bisphenol A, bisphenol AF, bisphenol S, hydroquinone and combinations thereof. These materials are considered to be well known by the generic names, but for clarity the chemical names for each of these materials are as follows: bisphenol A is hexafluoropropylidene diphenol; bisphenol AF is 4,4' isopropylidene diphenol; and bisphenol S is 4,4'-sulfonyldiphenyl. Desirably, the dihydroxy aromatic compound is bisphenol A, or bisphenol AF. The most preferred dihydroxy aromatic compound is bisphenol AF.

The ratio of dihydroxy aromatic compound:benzyltriphenyl phosphonium chloride is from 1.5:1 to 9:1.

These materials are most readily available as a product marketed as CURE 50 curing agent, which is a trademark of Dupont Dow Elastomer. This material is believed to be a mixture of bisphenol AF and benzltriphenyl phosphonium chloride in a ratio of about 1 part bisphenol AF to about 4 parts benzltriphenyl-phosphonium chloride. While the other materials listed above are suitable, this material is readily available and is widely used as a curing agent.

Further, the tan delta value of the formulation is desirably from about 0.01 to about 0.15. The tan delta is a widely used parameter that is indicative of the release properties of a surface. This value represents the loss modulus divided by the elastic modulus. It is a well-known value that is considered informative for this purpose and will not be discussed further except to note that the preferred value is from 0.01 to about 0.12.

Optionally, the formulation may contain up to 45 pph based upon the weight of the copolymer of a fluorinated ethylene propylene. This material can be used as a gloss-controlling agent and may be used to control the gloss of the surface of the formulation.

The aminosiloxane is an amino functional polydimethylsiloxane copolymer selected from the group consisting of (aminoethylaminepropyl)methyl, (aminopropyl)methyl, (aminopropyl)dimethyl and mixtures thereof. Such materials are well known.

These materials are discussed in somewhat greater detail in the patents previously incorporated by reference.

The term "low damping" refers to the ratio of the viscous modulus to the elastic modulus. Desirably this ratio is at a value such that further changes no longer affect receiver release properties. Typically such values are less than about 0.15 and probably less than about 0.12.

The formulation of the present invention provides a significant improvement over existing formulations of this type, which results in improved release properties when the formulations are used as an outer coating on fuser rollers. As indicated previously, the term "rollers" is used to refer to both pressure rollers and heated fuser rollers as well as similar contact surfaces which may be formed by fuser belts and the like. Such surfaces benefit similarly in all instances from the use of this material as an exterior coating.

As noted previously, such rollers typically include cushion materials of a quantity to provide the desired cushioning to the fuser rollers. Typically, cushion materials commonly comprise silicone rubbers or silicone polymers and the like as known to the art and may be coated onto the exterior of the inner core of a roller by any convenient method and thereafter cured and machined to a desired size and configuration.

The molecular weight of the uncured copolymer is largely a matter of convenience, although excessive large or excessively small molecular weight could create problems, as known to those skilled in the art. Typically, the copolymer has a number average molecular weight in the range from about 100,000 to about 200,000.

In the preparation of the formulations of the present invention, the fluorocarbon thermoplastic copolymer, aminosiloxane and curing agent, plus any other desired additives are mixed and subsequently are cured by heating to a selected temperature which is typically from about 260° C. to about 275° C., for a time from about 0.5 to about 3 hours.

In the use of the formulations of the present invention, typically the copolymer, aminosiloxane and curing agent are mixed with a suitable solvent such as methylethylketone in a mill or as otherwise as known to those skilled in the art. A variety of suitable solvents for this purpose are well known. After mixing, the materials are readily coated onto the exterior of the cushion layer around the core of the fuser roller by spraying, dipping or the like, as known to the art. Thereafter they are heated to a desired temperature for a suitable time to cure the formulation.

The cured formulation will be found to have a tan delta of from about 0.01 to about 0.15, and preferably from about 0.01 to about 0.12. This formulation provides outer coatings for rollers, which more readily release the receiver sheets from the roller forming the nip so that good receiver sheet flow is achieved through the fusing section. The improved release properties reduce the tendency for paper wrapping and the like to occur.

By reference to FIG. 1, the quantity referred to as a release distance is shown. In FIG. 1, a pressure roller 10 having a pressure roller surface 12 and a fuser roller 14 having a fuser roller surface 16 are shown. The rotation of the two rollers is shown by rotation arrows 18. A leading edge 20 of an air knife 21 having air knife nozzles 22 is shown. The function of the air knife is to assist in removing a receiver sheet 24 from surface 16 of fuser roller 14. A sheet of paper 24 is shown and has begun to separate from fuser roller 14. The distance between the leading edge 20 of the air knife and the point at which the sheet begins to separate from the fuser roller is shown by the dimension 26 and is referred to as the release distance. Desirably, this release distance is as large as possible.

While curing agents have been used in the past, it is has not been appreciated in the past that a very narrow range of curing agent concentration provides surprisingly superior results. For instance, it has been found that at concentrations below about 1 part per hundred based on the weight of the copolymer of curing agent the improved release distances are not achieved. Further, it has been found that at concentrations above about 2.5 pph, based on the weight of the copolymer, that gelation begins to occur quite rapidly to the detriment of additional coating activities using the solution of the formulation and to the quality and quantity of the resulting coating on the exterior of the coated fuser roller.

TABLE 1

| Composition | Amount/pph - Based Upon The Copolymer |
|---|---|
| Fluorocarbon thermoplastic random copolymer | 100 |
| Aminosiloxane | 10 |
| Zinc oxide | 7.44 |
| CURE 50 curing agent | 2 |
| Gloss controlling agent FEP (Fluoroethylenepropylene) | 10 |

EXAMPLE 1

Tests were run using varying amounts of CURE 50 curing agent and as shown in Table 2, in Tests 1-4, improved release distances were achieved with amounts of CURE 50 curing agent of 1.5 pph or greater. The composition shown in Table 1 was used for all tests with the CURE 50 curing agent quantities being varied as shown in Table 2.

TABLE 2

| Tests | Amount of CURE pph | Release Distance mm |
|---|---|---|
| 1 | 2 | 14 |
| 2 | 2 | 14 |
| 3 | 1.5 | 10 |
| 4 | 1.5 | 10 |
| Comparative 5 | 1.0 | 6 |
| Comparative 6 | 1.0 | 4 |
| Comparative 7 | 1.0 | 2 |

TABLE 3

| Tan Delta (200° C.) | Release Distance |
|---|---|
| 0.23 | BAD |
| 0.23 | BAD |
| 0.23 | BAD |
| 0.22 | BAD |
| 0.13 | GOOD |
| 0.18 | GOOD |
| 0.12 | GOOD |

It will be noted by reference to Table 2, that much shorter release distances are achieved with quantities of CURE 50 curing agent less than about 1.5 pph based upon the weight of the copolymer. Much increased release distances were achieved with quantities of CURE 50 curing agent of at least 1.5 pph based upon the weight of the copolymer. The tests shown were performed by varying the amounts of CURE 50 curing agent in the formulation in Table 1 and using the varied compositions to coat fuser rollers for tests in a fuser system.

EXAMPLE 2

Figure 2:
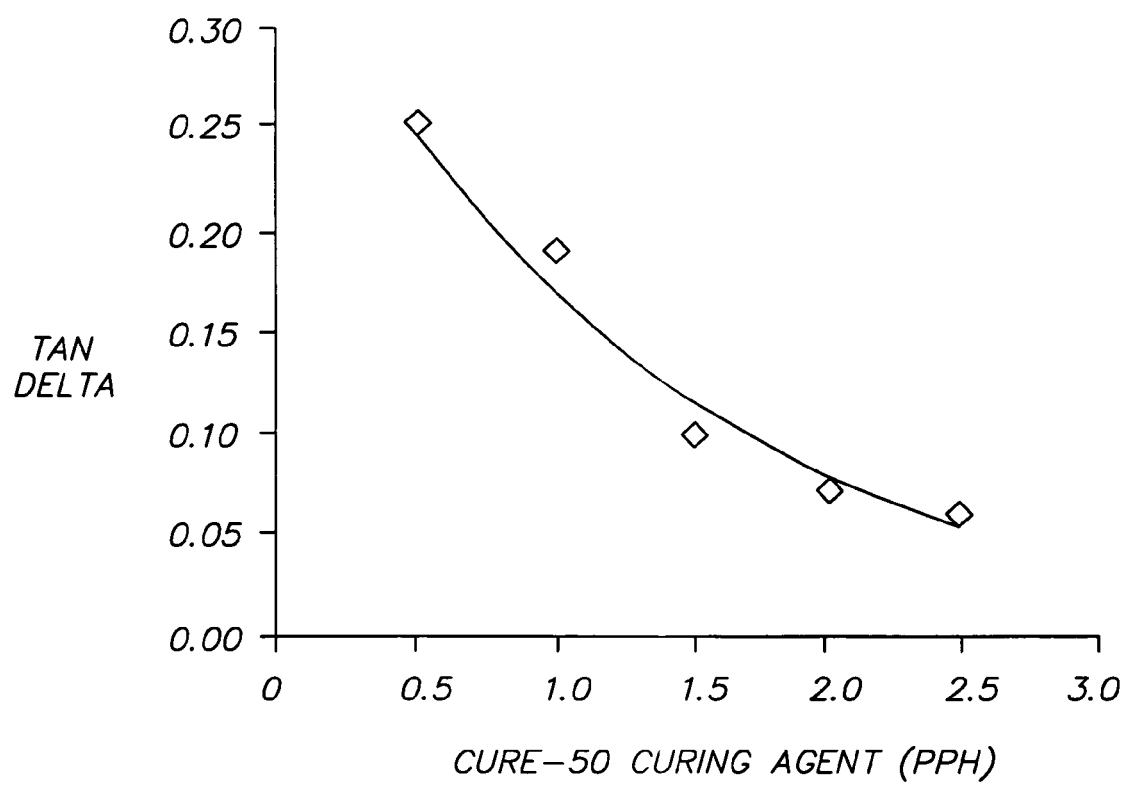
FIG. 2 is a graph of the test results from the tests run in Example 2.

In copolymer formulations, according to the present invention, the tan delta at 200° C. was adjusted to the values shown. The composition shown in Table 1 with varied quantities of CURE 50 curing agent as shown in FIG. 2 was tested. The release data shows the tan delta requirements for good release. The test data in FIG. 2 demonstrates that the tan delta value is effected by the amount of CURE 50 curing agent used. The test data in Table 3 shows the tan delta range, which should desirably be between 0.01 and 0.15, roughly corresponds to slightly less than 1.5 pph CURE 50 curing agent based upon the copolymer. This graph strikingly shows the effect achieved on the tan delta as a function of the amount of CURE 50 curing agent.

EXAMPLE 3

Figure 3:
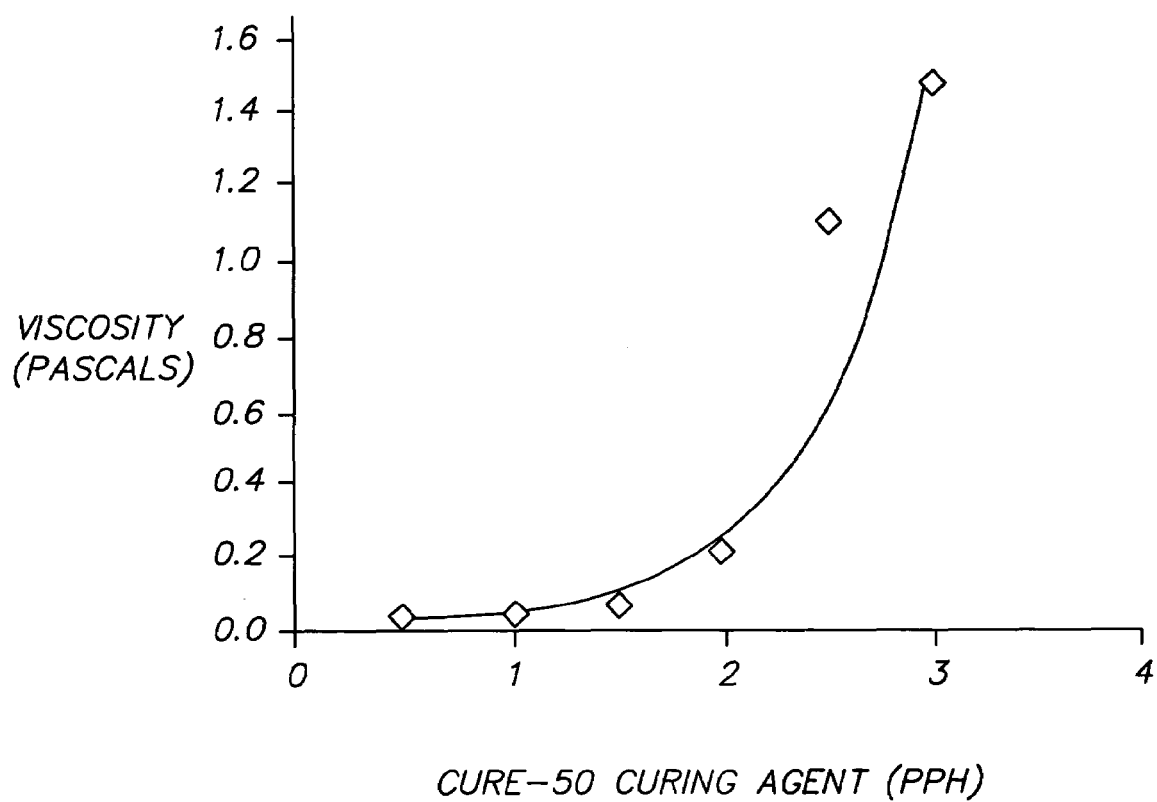
FIG. 3 is a graph showing the data from the test run in Example 3.

In Example 3, increased quantities of CURE 50 curing agent was used in the copolymer formulation of Table 1. The copolymer formulation was then dissolved in a suitable solvent, which was methyl ethyl ketone (MEK). It was observed that with increased quantities of CURE 50 curing agent, the viscosity of the resulting solution increased rapidly with additional quantities of CURE 50 curing agent above about 2.5 pph, as shown in FIG. 3. This increase in viscosity increases the difficulty of applying the formulation to the outside of a fuser roller and demonstrates the increased tendency of the resulting solution to gel rapidly. This rapid gelling and rapid curing can result in a less durable and less desirable exterior coating on the fuser rollers as well as increasing the difficulty in application of the copolymer solution to the rollers.

In view of the foregoing examples, it is believed clear that the use of very closely controlled quantities of CURE 50 curing agent, which comprises bisphenol AF and benzltriphenyl-phosphonium chloride in a ratio of about 1:4 is effective to reduce the tan delta to a desired range when used in proper quantities. Unfortunately it is also effective to increase the viscosity of the resulting copolymer solution undesirably when present in larger quantities. The quantity of CURE 50 curing agent thus must be closely controlled within narrow limits. This surprising improvement has not been heretofore known to the art and represents a significant improvement in the preparation of copolymer coatings for use on the exterior of fuser rollers while extending the useful life of solutions of copolymers, providing more suitable viscosities in copolymer solutions so that more effective coating can be achieved and providing coatings having greatly improved release properties.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A low damping fluorocarbon thermoplastic random copolymer roller coating formulation, the formulation having a tan delta from about 0.01 to about 0.15 and comprising: a fluorocarbon thermoplastic random copolymer containing from about 5 to about 20 pph, based upon the weight of the copolymer of an aminosiloxane and from about 1.5 to about 2.5 pph based upon the weight of the copolymer of a curing agent comprising an organophosphonium salt and a dihydroxy aromatic compound selected from the group consisting of bisphenol A, bisphenol AF, bisphenol S, hydroquinone and combinations thereof.

2. The formulation of claim 1, wherein the organophosphonium salt is benzyltriphenylphosphonium chloride.

3. The formulation of claim 2, wherein the benzyltriphenylphosphonium chloride and the dihydroxy aromatic compound are present in a weight$_{1:3}$ ratio from about 1.5 to 9 parts of dihydroxy aromatic compound per part of benzyltriphenylphosphonium chloride.

4. The formulation of claim 1, wherein the tan delta is from about 0.01 to about 0.12.

5. The formulation of claim 1, wherein the formulation contains up to about 45 pph fluoroethylenepropylene (FEP) based upon the weight of the copolymer.

6. The formulation of claim 1, wherein the aminosiloxane is an amino functional polydimethylsiloxane copolymer selected from the group consisting of (aminoethylamino propyl) methyl, (aminopropyl) methyl, (aminopropyl) dimethyl and mixtures thereof.

7. In a low-damping fluorocarbon thermoplastic random copolymer roller coating formulation comprising a fluorocarbon thermoplastic random copolymer; from about 5 to about 20 pph based upon the weight of the copolymer of an aminosiloxane; and a curing agent comprising an organophosphonium salt and a dihydroxy aromatic compound selected from the group consisting of bisphenol A, bisphenol AF, bisphenol S, hydroquinone and combinations thereof the improvement comprising the use of a quantity from about 1.5 to about 2.5 pph based on the weight of the copolymer of the curing agent and adjusting the tan delta of the formulation to a value from about 0.01 to about 0.15.

8. The improvement of claim 7, wherein the tan delta value is from about 0.01 to about 0.15.

9. The improvement of claim 7, wherein the organophosphonium salt is benzltriphenylphosphonium chloride.

10. The improvement of claim 9, wherein the dihydroxy aromatic compound and benzltriphenylphosphonium chloride are present in the curing agent in a weight ratio of about 1:5 to about 9:1.

* * * * *